United States Patent [19]

Pantland et al.

[11] 4,100,931
[45] Jul. 18, 1978

[54] FIRE DAMPER

[75] Inventors: Frederick William Pantland, Tralee, Ireland; Ernest Francis Pantland, Johannesburg, South Africa

[73] Assignee: Leonard Joseph Fisher, Sandton, South Africa

[21] Appl. No.: 704,599

[22] Filed: Jul. 12, 1976

[30] Foreign Application Priority Data

Jul. 18, 1975 [ZA] South Africa .................. 75/4627

[51] Int. Cl.² ............................................ F16K 17/38
[52] U.S. Cl. ................................. 137/77; 137/7 B; 160/1; 251/58
[58] Field of Search ................. 137/75–78, 137/601; 160/1, 2, 6; 49/7; 98/86; 251/58, 294; 126/287.5

[56] References Cited

U.S. PATENT DOCUMENTS

| 2,313,095 | 3/1943 | Schneider | 251/58 X |
| 2,586,906 | 2/1952 | Beckett et al. | 137/625.65 |
| 3,591,221 | 7/1971 | Alley | 49/7 X |
| 3,646,877 | 3/1972 | Ellis | 160/34 X |
| 3,960,065 | 6/1976 | McCabe | 137/75 X |

*Primary Examiner*—Martin P. Schwadron
*Assistant Examiner*—Richard Gerard
*Attorney, Agent, or Firm*—Beveridge, DeGrandi, Kline and Lunsford

[57] ABSTRACT

A fire damper of the kind in which at least one flap is pivoted in a duct between a first position in which the flap closes the duct and a second position in which the duct is open. A suitably powered winching motor is adapted to control the movement of the flap through a linkage including a fusible link so that when the motor is energized the flap is moved to its second position or open position provided that the fusible link is still intact whereas when the motor is de-energized the flap is moved to its first or closed position.

5 Claims, 2 Drawing Figures

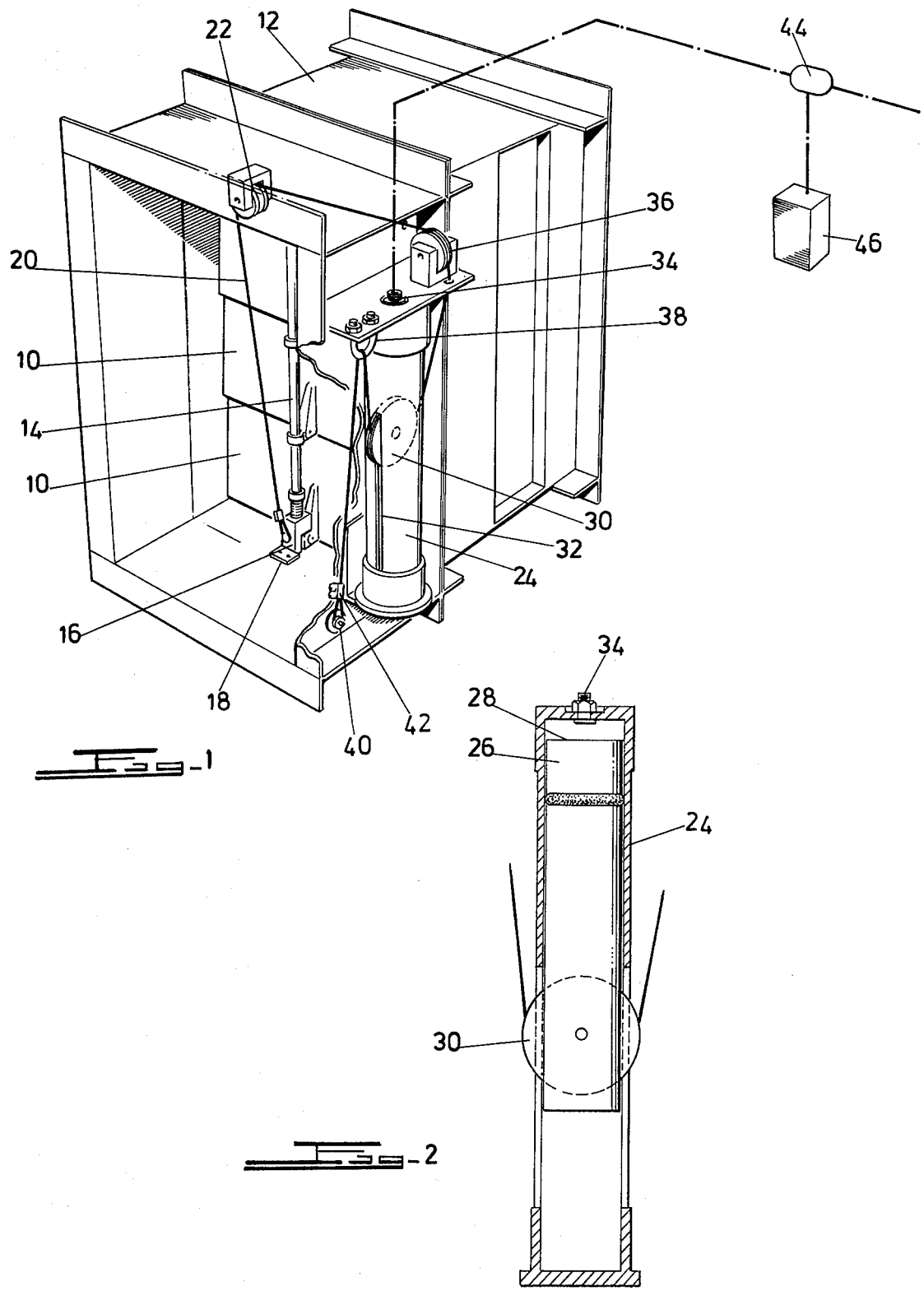

FIRE DAMPER

This invention relates to fire dampers.

Fire dampers for use in ventilation ducts are well known. Conventionally a fire damper comprises a flap or flaps which is movable between an open position and a closed position in which the duct is closed off. In use the fire damper is open and it is caused to close under the influence of various events. Thus the fire damper may be held open by a linkage that includes a fusible link. When the link fuses, the damper closes. Also included in the linkage may be an element that can be actuated by a signal from a device such as a smoke detector.

In the latter event it has been found that fire dampers can close as a result of false alarms, e.g., as a result of smoke from a full conference room where many people present smoke cigars.

If a fire damper closes because a fusible link has fused, one has to replace the link. This means getting access to the fire damper in the ceiling. Up to now, if the damper closes as a result of a signal, e.g., from a smoke detector, it has also been necessary to re-set the fire damper manually and the labour involved was much the same as when a fusible link went.

It is an object of the present invention to provide an improved fire damper which can be automatically re-set after closing.

A fire damper according to the invention comprises an orifice, at least one flap pivoted in the orifice between a first position in which it closes the orifice and a second position in which the orifice is fully open, a winching motor, and a motion transmitting linkage operable by the motor and including a fusible link, one end of the linkage being connected to the flap, and the motor being adapted to be energized from a suitable source of energy so that energization of the motor causes the flap to open provided that the fusible link is still intact whereas de-energization of the motor causes the flap to close.

Further according to the invention interruption of the fusible link causes the flap to close.

Further according to the invention the winching motor comprises a pneumatically-operable piston and cylinder.

Further according to the invention the motion transmitting linkage is a cable, one end of which is attached to the flap and the other end of which is anchored to fixed structure through the fusible link.

Further according to the invention the flap is latched closed in the first position, the flap being unlatched when the motor is energized, provided that the fusible link is still intact.

Further according to the invention there is provided means to interrupt the flow of energy to the winching motor in the presence of smoke.

Further according to the invention the winching motor is adapted to be energized by compressed air fed through a solenoid controlled valve, the valve being adapted to be closed in the presence of smoke to interrupt the flow of air to the motor.

Further according to the invention there is provided a smoke detector, adapted to close the valve in the presence of smoke and to open the valve in the absence of smoke.

The invention further provides a control unit for a fire damper having at least one pivoted flap biased to its closed position, comprising a winching motor and a motion transmitting linkage operable by the motor and including a fusible link, one end of the linkage being adapted to be connected to the flap of the fire damper, and the motor being adapted to be energized from a suitable source of energy so that energization of the motor causes the flap to open provided that the fusible link is still intact whereas de-energization of the motor causes the flap to close.

In a preferred form of the invention the control unit is mounted on a section of a ventilation duct.

To illustrate the invention an embodiment thereof is described hereunder with reference to the accompanying drawings in which:

FIG. 1 is an isometric view of the fire damper of the invention with parts cut away; and FIG. 2 is a cross-sectional elevation through the pneumatic cylinder of the fire damper.

With reference to the drawings a series of pivotable flaps 10 are located in a ventilation duct 12 and are adapted for movement between a first position (as illustrated in FIG. 1) in which the flaps close the duct, and a second position in which the flaps are opened.

The flaps are ganged together by means of a common operating rod 14 the lower end of which terminates in a latch 16 which in turn is adapted to engage a stop 18 when the flaps 10 are closed.

The latch 16 is fixed to one end of a cable 20 which extends upwardly in the duct and passes over a first pulley 22 located inside the duct.

A cylinder 24 is located outside the duct in close proximity to the flaps 10. A piston 26 having a closed upper face 28 is located for reciprocating movement in the cylinder 24. A second pully 30 is mounted for rotation on the piston 26. The diameter of the second pulley 30 is greater than that of the cylinder 24 and diametrically-opposed slots 32 are formed in the walls of the cylinder 24 to facilitate vertical movement of the second pulley 30 in the cylinder 24.

An air inlet 34 is provided at the upper end of the cylinder 24.

The cable 20 passes from the first pulley 22 over a third pulley 36 from which it passes underneath the second pulley 30. From the second pulley 30 the cable passes through a fixed hook 38 to an anchoring point 40 on the exterior of the duct 12. A fusible link 42 of conventional design is connected into the cable 20 between the hook 38 and the anchoring point 40.

The air inlet 34 at the upper end of the cylinder 24 is adapted to be connected to a source of compressed air. This could, for example, be the compressor which is used for volume control damping in the building in which the fire damper is to be used. The compressed air supply from the compressor is passed through a solenoid valve 44 before being passed to the air inlet 34. The solenoid valve 44 is in turn controlled by a smoke detector 46 located at a convenient point.

In use (assuming that conditions are normal, i.e., that no smoke or fire is present) the smoke detector 46 is inoperative and the solenoid valve 44 is therefore open. Air from the compressor (not shown) is therefore fed to the air inlet 34. This causes the piston 26 to be forced downwards in the cylinder 24 provided that the fusible link 42 is intact. The downward movement of the piston 26 will in turn cause the latch 16 to be disengaged from the stop 18 and the flaps 10 will therefore be moved into their open position to open the duct 12.

In the event that the smoke detector 46 detects smoke it will cause the solenoid valve 44 to close. The air supply to the air inlet 34 will therefore be interrupted and the piston 26 will therefore rise in the cylinder 24 causing the flaps 10 to be closed and the latch 16 to be engaged with the stop 18. The fire damper will thus be closed to prevent the fire and the smoke from spreading. If it should happen that the smoke detector 46 is actuated as a result of a false alarm, for example such as would be caused by a group of heavy smokers in a room, the disappearance of the smoke will eventually cause the smoke detector 46 to become inoperative again which in turn will cause the solenoid valve 44 to open and thereby cause the flaps 10 to be raised again to their open position. The re-opening of the fire damper is thus entirely automatic under these circumstances.

In the event that the fusible link 42 is caused to rupture as a result of a fire, the cable 20 will be detached from its anchoring point 40 and the flaps 10 will close the duct.

Once the flaps 10 have closed as a result of a rupture of the fusible link 42 the damper cannot be re-set automatically and will therefore have to be re-set manually in the conventional manner.

It follows from what has been said above the the fire damper of the invention is a fail-safe device. In other words in the event of a failure in the compressed air supply or in the event of an electrical mains failure the result will be the same, namely that the piston 26 will rise in the cylinder 24 to latch and close the flaps 10.

Another feature of the invention is that the cylinder 24 together with its associated pulleys 30 and 36 could be mounted on a separate section of ventilation duct to enable the features provided by the invention to be incorporated into an existing ventilation duct having conventional fire dampers, Another very significant feature of the invention is that the solenoid valve 44 could be closed or opened from a remote point. For example the remote point could be a control room in a large building from which it would therefore be possible to test each of the fire dampers in the building individually as opposed to the present system of attempting to test each of the fire dampers manually.

In the example described above a pneumatically-operated piston 26 is used to raise or lower the flaps 10. The same objective could of course be achieved in other ways, as for example by means of an hydraulically-operated cylinder or by an electrical solenoid.

We claim:

1. A fire damper comprising an orifice, at least one flap pivoted in the orifice between a first position in which it closed the orifice and a second position in which the orifice is fully open, a winching motor, a motion transmitting linkage operable by the motor and including a fusible link, one end of the linkage being connected to the flap, the motor being adapted to be energized by compressed air fed through a solenoid controlled valve so that energization of the motor causes the flap to open provided that the fusible link is still intact whereas de-energization of the motor causes the flap to close, and a smoke detector adapted to close the valve in the presence of smoke and thereby cause the motor to become de-energized, said smoke detector being further adapted to open the valve in the absence of smoke and thereby cause the motor to become energized.

2. A fire damper as claimed in claim 1 in which interruption of the fusible link causes the flap to close.

3. A fire damper as claimed in claim 1 in which the winching motor comprises a pneumatically-operable piston and cylinder.

4. A fire damper as claimed in claim 1 in which the motion transmitting linkage is a cable, one end of which is attached to the flap and the other end of which is anchored to fixed structure through the fusible link.

5. A fire damper as claimed in claim 1 in which the flap is latched closed in the first position, the flap being unlatched when the motor is energized, provided that the fusible link is still intact.

* * * * *